(12) United States Patent
Sprangle (10) Patent No.: US 8,478,969 B2
(45) Date of Patent: Jul. 2, 2013

(54) PERFORMING A MULTIPLY-MULTIPLY-ACCUMULATE INSTRUCTION

(75) Inventor: Eric S. Sprangle, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 475 days.

(21) Appl. No.: 12/889,916

(22) Filed: Sep. 24, 2010

(65) Prior Publication Data

US 2012/0079252 A1    Mar. 29, 2012

(51) Int. Cl.
*G06F 7/38* (2006.01)
*G06F 9/00* (2006.01)
*G06F 9/44* (2006.01)
*G06F 15/00* (2006.01)

(52) U.S. Cl.
USPC ............................................. 712/222; 712/22

(58) Field of Classification Search
None
See application file for complete search history.

(56) References Cited

U.S. PATENT DOCUMENTS

| | | | | |
|---|---|---|---|---|
| 6,003,058 | A * | 12/1999 | Kirschenbaum et al. | 708/607 |
| 6,446,193 | B1 * | 9/2002 | Alidina et al. | 712/35 |
| 6,571,268 | B1 * | 5/2003 | Giacalone et al. | 708/524 |
| 7,107,305 | B2 * | 9/2006 | Deng et al. | 708/523 |
| 8,051,121 | B2 * | 11/2011 | Aldrich et al. | 708/319 |
| 2003/0069913 | A1 * | 4/2003 | Deng et al. | 708/524 |

OTHER PUBLICATIONS

Intel, "Intel Advanced Vector Extensions Programming Reference," Application Programming Model Chapter, Section 2.3 Fuse-Multiply-Add (FMA) Numeric Behavior, pp. 2-6 to 2-10, Jan. 2009.

* cited by examiner

*Primary Examiner* — Corey S Faherty
(74) *Attorney, Agent, or Firm* — Trop, Pruner & Hu, P.C.

(57) ABSTRACT

In one embodiment, the present invention includes a processor having multiple execution units, at least one of which includes a circuit having a multiply-accumulate (MAC) unit including multiple multipliers and adders, and to execute a user-level multiply-multiply-accumulate instruction to populate a destination storage with a plurality of elements each corresponding to an absolute value for a pixel of a pixel block. Other embodiments are described and claimed.

20 Claims, 9 Drawing Sheets

PERFORMING A MULTIPLY-MULTIPLY-ACCUMULATE INSTRUCTION

BACKGROUND

Modern microprocessors typically include a pipeline having different stages, including one or more front-end stages to obtain an instruction and then begin processing of the instruction. These stages place the instruction, which is often received in a so-called macro-instruction format, into a format usable by the processor, e.g., one or more micro-instructions or so-called µops. These µops are passed to further portions of the processor pipeline. For example, an out-of-order engine may reorder instructions from their program order to an order more efficient for processing purposes. From this out-of-order engine, instructions may be provided to one or more of multiple execution units. The execution units are the calculating engines of the processor and can perform various operations on the data such as various arithmetic and logic operations. Different processors may have different types of execution units. When results are obtained in these execution units, the resulting data can be provided to one or more back-end stages of the processor such as a reorder engine that can reorder instructions executed out of order back into program order. Back-end stages may further include a retirement unit to retire instructions that have been validly completed.

Historically, processors were configured to operate on scalar values, such as 8-bit, 16-bit, 32-bit or other width values. As processing speeds and transistor counts have increased, many processors have begun to incorporate vector units. Vector units are used to perform a single instruction on multiple data units, in which the instruction may be in so-called single instruction multiple data (SIMD) form. Such vector processing can be especially adapted for graphics and other compute intensive workloads. While certain user-level instructions have been introduced to perform some operations on vector data, there are still inefficiencies in processing vector data. Furthermore, while certain execution units are configured to handle vector operations, these hardware units also can be inefficient for certain vector processing.

DETAILED DESCRIPTION

In various embodiments, a user-level vector instruction can be used to efficiently perform multiple operations on a set of operands. More specifically, a user-level vector instruction can be used to perform a multiply-multiply-add operation, also described herein as a SUPERMADD operation, on vector data to enable processor hardware to efficiently perform a number of operations that otherwise would require a plurality of different user-level instructions and many more arithmetic computations. Still further, some embodiments may provide for processor hardware to efficiently perform this vector instruction.

Using embodiments of the present invention, a much higher throughput can be realized to process incoming data. In addition to increasing throughput, e.g., by providing only a single user-level instruction to perform multiple arithmetic operations on multiple incoming data operands, a reduced number of operations to realize a result can occur, based on an understanding of commonality of operations performed in multiple levels of the multiply-multiply-add operation.

While the scope of the present invention is not limited in this regard, embodiments may be particularly appropriate for graphics processing. In many graphics workloads, certain operations are performed on groups of data representing pixel information for individual pixels of a display. In such workloads, a group of pixels can be identified, e.g., a 4×4 block of pixels or another such number. For each such block of pixels, various operations may be performed in the graphics workload.

For example, pixel data may be processed in a vertex shader to determine attribute information for vertices of a shape, e.g., a triangle represented, at least in part, by the pixels of the block. The vertex shader may operate to obtain interpolated attribute values for the pixels of the block. While the scope of the present invention is not limited in this regard, in one implementation this interpolation may be a barycentric interpolation, and more particularly may provide for both perspective correction and non-perspective correction. After such operations in a vertex shader, the processed information may be provided, e.g., to a pixel shader where additional processing may occur. Further details regarding operations performed in handling an interpolation or other operation using an instruction in accordance with an embodiment of the present invention will be discussed below.

To better understand concepts described herein, a background on vector operations is set forth. Some single instruction multiple data (SIMD) and other multimedia types of instructions are considered complex instructions. Most floating-point related instructions are also complex instructions. As such, when an instruction decoder encounters a complex macro-instruction, microcode can be accessed to retrieve a microcode sequence for that macro-instruction. The various µops for performing that macro-instruction are communicated to, e.g., an out-of-order execution logic, which may have buffers to smooth out and re-order the flow of micro-instructions to optimize performance as they flow through the pipeline and are scheduled for execution. Allocator logic allocates buffers and resources that each uop needs in order to execute. Renaming logic may rename logical registers onto entries in a register file (e.g., physical registers).

In one embodiment, vector instructions can be executed on various packed data type representations. These data types may include a packed byte, a packed word, and a packed doubleword (dword) for 128 bits wide operands. As an example, a packed byte format can be 128 bits long and contain sixteen packed byte data elements (a so-called 16-wide vector). A byte is defined here as 8 bits of data. Information for byte data elements can be stored in bit 7 through bit 0 for byte 0, bit 15 through bit 8 for byte 1, bit 23 through bit 16 for byte 2, and finally bit 120 through bit 127 for byte 15.

Generally, a data element is an individual piece of data that is stored in a single register or memory location with other data elements of the same length. In some packed data sequences, the number of data elements stored in a register can be 128 bits divided by the length in bits of an individual data element. Although the data types can be 128 bit long, embodiments of the present invention can also operate with 64 bit wide or other sized operands. It will be appreciated that packed data formats may be further extended to other register lengths, for example, to 96-bits, 160-bits, 192-bits, 224-bits, 256-bits or more. In addition, various signed and unsigned packed data type representations can be handled in multimedia registers according to embodiments of the present invention.

Figure 1:
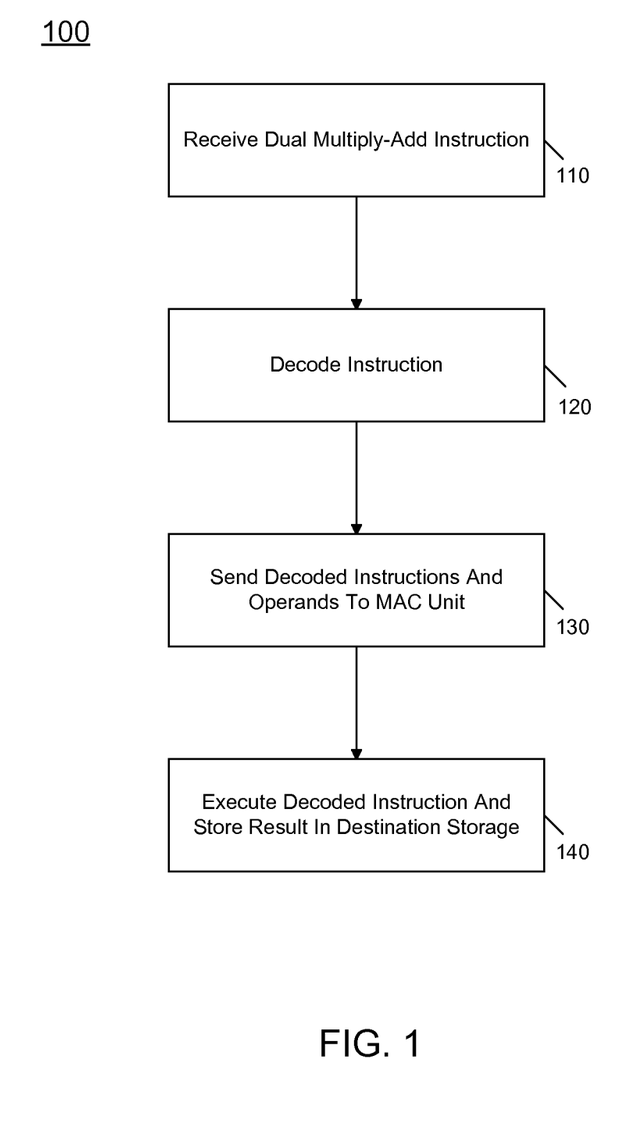
FIG. 1 is a flow diagram of a method in accordance with an embodiment the present invention.

Referring now to FIG. 1, shown is a flow diagram of a method in accordance with an embodiment the present invention. As shown in FIG. 1, a high level view of operations performed in executing a single user-level instruction to implement a multiply-multiply-add operation efficiently is described. As seen in FIG. 1, method 100, which may be implemented within one or more portions of a processor such as a processor having an out-of-order architecture is shown. As seen, method 100 may begin by receiving a dual multiply-add instruction (block 110). This instruction may be a user-level or macro-instruction, e.g., received by a processor front end. Responsive to receipt of this instruction, the instruction may be decoded, e.g., in an instruction decoder, also of the front end (block 120).

Next, the decoded instruction, along with one or more operands received with the instruction may be sent to an execution unit (block 130). In some embodiments, this execution unit may be a multiply-accumulate (MAC) unit, although the scope of the present invention is not limited in this regard. While shown as being directly sent to the MAC unit, in some implementations decoded instructions may first be stored in a temporary storage, e.g., a decoded instruction queue and then provided, e.g., to out-of-order logic, which may choose to reorder instruction flow of a program including this SUPERMADD instruction to more efficiently perform operations on the data as the data and the desired execution units become available.

Referring still to FIG. 1, when all data for the instruction becomes available and the given execution unit also becomes available, control passes to block 140 where the decoded instruction may be executed. Still further, a result of the instruction may be stored in a destination storage. For example, a user-level instruction may identify a destination location for the result, which may correspond to a vector register so that result data, in the form of one or more vectors can be appropriately stored such that the result can be used in further program execution. While shown with this particular implementation in the embodiment of FIG. 1, understand the scope of the present invention is not limited in this regard.

Figure 2:
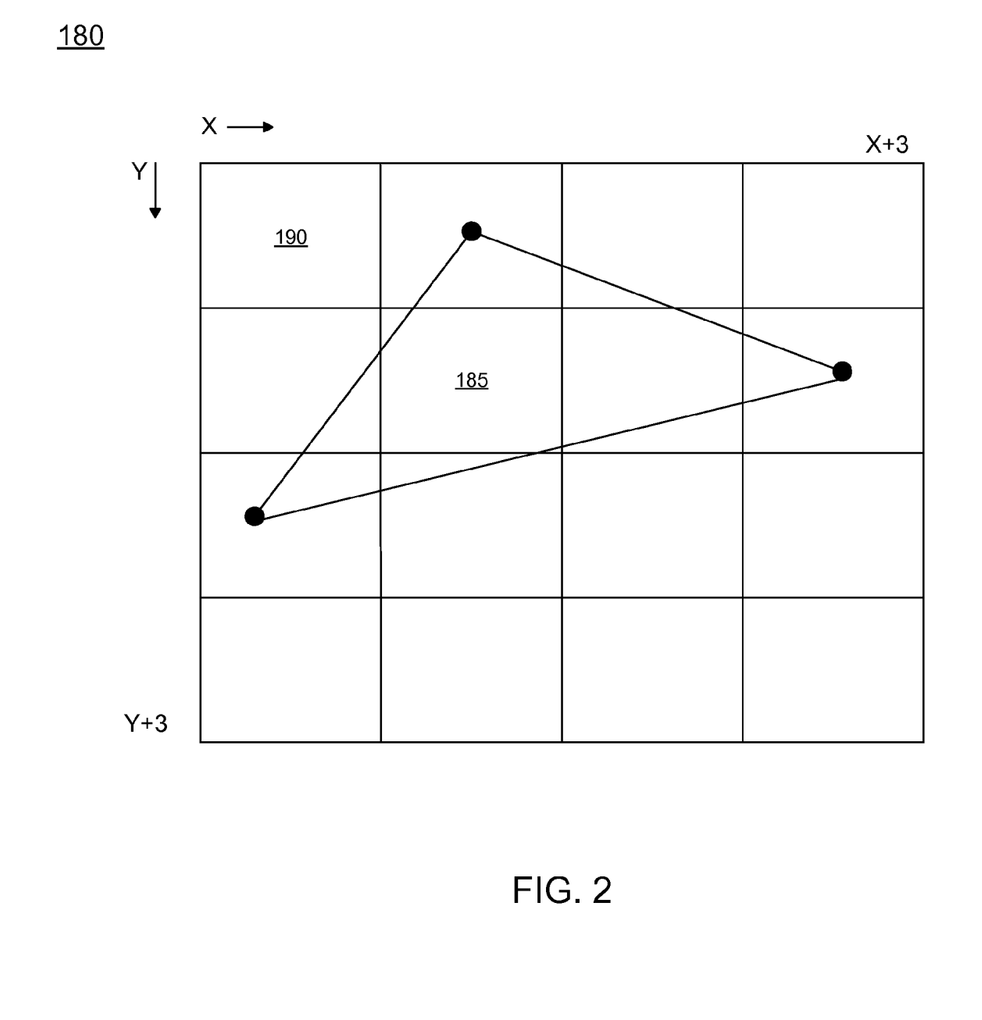
FIG. 2 is a block diagram of a group of pixels having a polygon to be drawn thereon.

In graphics workloads, one example use of a SUPER-MADD instruction is to handle pixel interpolations with regard to a pixel block. Referring now to FIG. 2, shown is a block diagram of a group of pixels having a polygon to be drawn thereon. As seen in FIG. 2, pixel block 180 may be a 4×4 matrix of pixels. While shown with 16 individual pixels in the example of FIG. 2, understand that in different embodiments, more or fewer pixels may constitute a pixel block. For example, in other implementations a SUPERMADD instruction can be performed on fewer pixels (e.g., a 2×2 block) or more pixels, e.g., a 16×16 or greater block. Furthermore, understand that the number of pixels in the X and Y dimensions need not be the same and need not have base2 values. As shown in FIG. 2, within pixel block 180, a triangle 185 is present that has vertices present in three pixels of the block. Of course in other implementations, a triangle or other polygon may have one or more vertices present within a given pixel block and may extend to another such pixel block. As part of shading operations, e.g., a vertex shading operation, attributes of the different pixels of the block may be determined. Such attributes may correspond to pixel positional information, e.g., XYZ values along with other attributes such as an attribute corresponding to one or more colors with which the pixel is to be shaded (e.g., RGB values).

When processing a block of pixels such as that in FIG. 2, positional information, e.g., relating to the pixels in the X and Y directions can first be determined using a single reference pixel of the block. With reference to FIG. 2, pixel 190 may correspond to a reference pixel for the block. Thus based on XY values for this single pixel, offset values to each of the other pixels of the block from this reference pixel can be determined. Instead of performing individual calculations to determine the XY offsets of each pixel, which may use 32 different addition operations, embodiments may leverage the fact that a common offset can be applied to multiple pixels in both the X and Y directions to thus reduce the number of mathematical operations to be performed.

In pixel shading operations, after pixel values have been determined, a constant may be applied to each of the values to thus form a result that can be provided for further operations. Here again, instead of performing individual multiplication operations for each of the X and Y values, embodiments may again leverage the fact that a single constant is applied to each of these pixel values to thus reduce the number of operations performed.

As will be described further below, different implementations may optimize the number of mathematical operations performed in obtaining a result of the following general form: AX+BY+C, where X and Y are reference values, A and B and C are constant coefficients.

To understand how embodiments can optimize, via a single user-level instruction, a sequence of instructions that would need to be performed otherwise, it is instructive to consider a set of example instructions that can be performed to obtain desired results using conventional multiple user-level vector addition and multiplication operations.

Referring now to Table 1, shown are example instructions that can be performed to realize a result of the above equation using multiple user-level instructions.

TABLE 1 vaddps v0, v0, PixelOffsetX; PixelOffsetX = 0123 0123 0123 0123
vaddps v1, v1, PixelOffsetY; PixelOffsetY = 0000 1111 2222 3333
vmadd233ps v2, v0, v22; temp = A*PixelX+C
vmadd231ps v2, v1, v22{cccc}; temp += B*PixelY In sum, these instructions can be used to populate vector registers with pixel coordinate values (e.g., X and Y values), execute multiplications, and then further to add a constant to each of the pixels to thus realize a result, which may be stored in a destination storage such as a vector register for later use by other portions of the graphics workload. Assume for purposes of discussion that vector registers may provide for storage of 16 individual data elements, i.e., a so-called 16 wide register. In this embodiment, each data element may be of floating-point 32-bit format, although other formats such as 16-bit integer values are also possible.

Referring now to Table 2, shown is a Table that illustrates the operations performed by the above instructions of Table 1 to obtain a set of 16 values, corresponding to a result of the plane equation Ax+By+C, evaluated at each pixel location.

TABLE 2

A, A, A, A A, A, A, A A, A, A, A A, A, A, A
*
100, 101, 102, 103, 100, 101, 102, 103, 100, 101, 102, 103 100, 101, 102, 103
+
B, B, B, B B, B, B, B B, B, B, B B, B, B, B
*
200, 200, 200, 200, 201, 201, 201, 201, 202, 202, 202, 202, 203, 203, 203, 203
+
C, C, C, C, C, C, C, C, C, C, C, C, C, C, C, C

As seen, beginning in the second line of Table 2, assume a reference pixel value of (100, 200), namely an X value of 100 and a Y value of 200 for the reference pixel. Then via the first add operation, which may correspond to a vector add, pixel offsets having values of 0, 1, 2 and 3 can be added to the reference X value. In this conventional operation, thus 16 different add operations occur. Similar operations occur with regard to the Y reference pixel (as seen in the fourth line of Table 2). However, note that the values used for the pixels instead increment every fourth pixel value. However, 16 addition operations still are performed. These two vector addition instructions thus populate a pair of vector registers with pixel offset values corresponding to the XY values for each of the pixels of the block. Then, a pair of vector multiply-add instructions are performed to take each of these individual pixel values, multiply them by a given constant value (i.e., a first coefficient A for the X pixels, and a second coefficient B for the Y pixels) and, with regard to the first vector multiply add instruction, to add an additional value, namely a constant value C. Thus at the conclusion of these four vector instructions, and assuming 16 wide vectors to represent a pixel block of 16 pixels, the above four instructions represent 32 individual adds and 32 individual multiply operations. Further, note that multiply operations can be computationally expensive, as a 32-bit multiply effectively requires the implementation of 32 adds.

As discussed above, in various embodiments a single vector multiply-multiply-add instruction can be executed. By way of this instruction, and the understanding of a series of conventional instructions that it can replace, different optimizations for reduced numbers of add and multiply operations can be realized to thus perform the multiply-multiply-addition instruction with high computational, area, and power consumption efficiencies.

As one example of reduced addition and multiply operations, it can be recognized that the pixel offset operations represented in the above Table 2 perform the same calculation a number of times. Accordingly, as one optimization, only a single calculation is performed for each of the offset values. Furthermore, it can be recognized that multiplication operations are more expensive than addition operations. Accordingly, a single multiplication operation can be performed to obtain the product of the given coefficient and one pixel value, and additions (and/or subtractions as discussed below) can be performed to obtain the other values.

Referring now to Table 3, shown are example operations to obtain four individual pixel offsets, both for the X & Y directions.

TABLE 3

A × 100: + A + 2A + 3A
B × 200: + B + 2B + 3B

As seen, assume the reference pixel of X value 100 and Y value 200, a single multiplication operation of A×100 can be performed, and then three addition operations, namely an addition of A, 2A & 3A to the product of A×100 can be performed. Similarly, with respect to the reference pixel Y, having a value of 200, the same operations can be performed.

As a further optimization, certain embodiments may leverage the fact that, since an addition of the product+3A requires both an add and a shift operation, another value (e.g., a different pixel location) that is within the block, rather than on the edge of the block, can be used as the reference pixel. For example, assume a reference pixel having a XY value of 101,201 is used (e.g., corresponding to the pixel marked as 185 in FIG. 2). Then, Table 4 below shows the operations that can be performed, namely a single multiplication with the corresponding coefficient and this reference pixel value, and three addition operations, namely −A, +A, & +2A, each of which can be implemented via a simple addition operation (the same operation can be performed on the Y pixel). Thus in reference to Table 4, note that the operations to populate two vectors with pixel offset values can be performed using, respectively a single multiplication and three addition operations.

TABLE 4

A × 101: −A + A + 2A

Then to realize the final result with the addition of a constant value C, 16 different addition operations can be performed. However, again note that there can be further efficiencies.

Specifically, instead of the first level operations described above in regard to Table 4, instead as in Table 5, the multiplication operation may be implemented as a multiply-accumulate in which each reference value is multiplied with the corresponding coefficient, and the constant value is added to the sum of these products. This occurs before the three addition operations set forth above.

TABLE 5

((A × 101) + C) + B × 201 = Base Value
Base Value: −A + A + 2A

Thus to obtain a desired result of the multiply-multiply-accumulate instruction efficiently, operations in accordance with the following Table 6 can be performed:

TABLE 6

| | |
|---|---|
| A × 101 | 1 multiplication |
| B × 201 | 1 multiplication |
| Sum1 + Sum2 = Interim | 1 addition |
| Interim + C= Base Value | 1 addition |
| Base Value: −A + A + 2A | 3 additions (resulting in intermediate sums 1-3) |
| Intermediate Sums 1-3: +0 − B + B + 2B | 12 additions (resulting in final sums 1-12) |

As seen in Table 6, a base value may be obtained using two multiplication operations, each having a multiplicand corresponding to a coefficient and a multiplier corresponding to a pixel reference value. The resulting two products can then be summed, along with the constant value (e.g., C) to thus realize the base value. The first coefficient (e.g., for the X values) may then be added, subtracted and a 2X value may also be added to thus realize 3 add operations, which can populate certain entries of the vector register. Then using the four values from above, namely the base value and the sums of these three different addition operations, 12 addition operations can be performed, namely each of the three intermediate sum values can be added with zero, the second coefficient, the negative second coefficient, and 2X the second coefficient, the results of which can populate the remaining entries of the vector register. Accordingly, using two single multiplies and 17 add operations, the final result is achieved. In contrast, referring back to Tables 1 and 2 using conventional instructions, the same result requires 32 different multiplies and 64 add operations. Note further that each multiply operation corresponds to approximately 8 different addition operations, a significant computation efficiency can be realized.

Figure 3:
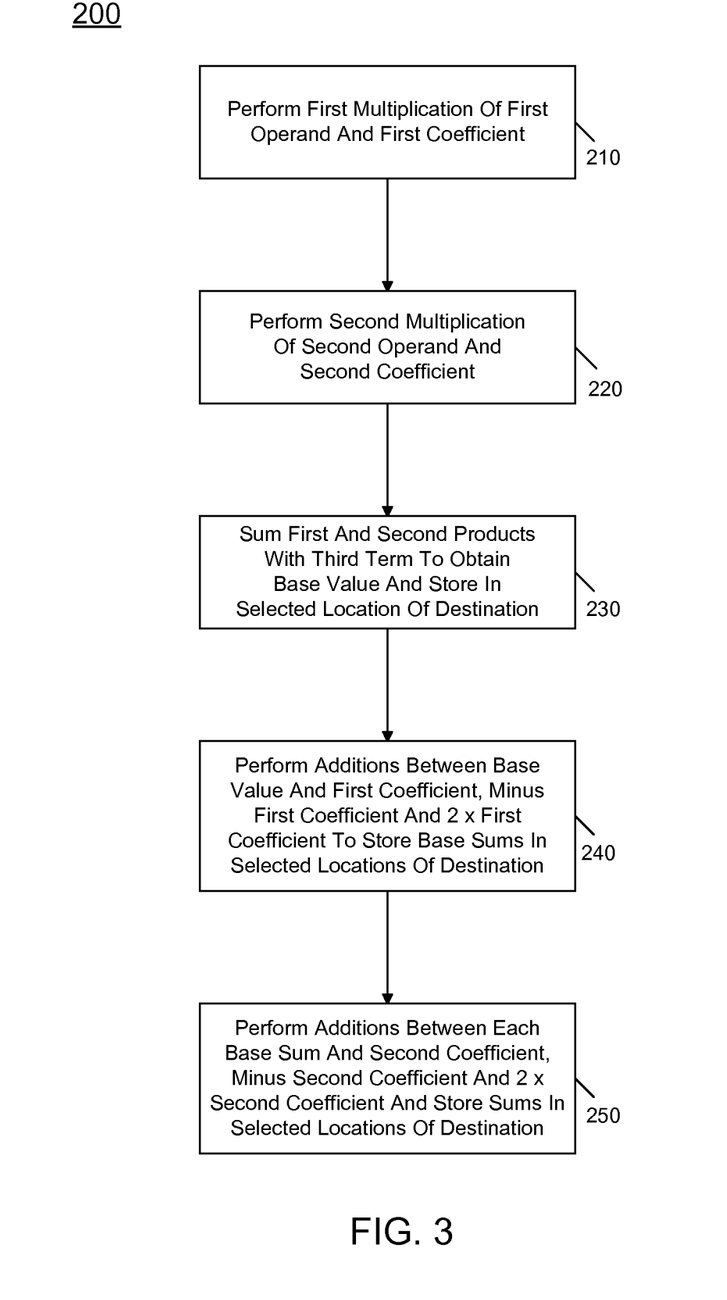
FIG. 3 is a flow diagram of a method in accordance with another embodiment of the present invention.

Referring now to FIG. 3, shown is a flow diagram of a method in accordance with one embodiment of the present invention. More specifically, method 200 of FIG. 3 corresponds to operations performed in executing a multiply-multiply-accumulate instruction, e.g., in a fused floating-point multiply accumulate unit of a processor. As seen method 200 may begin by performing a first multiplication of a first operand value and a first coefficient (block 210). More specifically, with reference to the interpolation discussion above, the first operand may correspond to a reference pixel, e.g., in an X coordinate axis and the first coefficient may correspond to a predetermined weighting value or constant. A similar multiplication operation may be performed between a second operand and a second coefficient (block 220). Again, this multiplication may be between a reference pixel value (e.g., in the Y coordinate axis) and a second weighting value. Then at block 230 the two products may be summed with a third term, e.g., a constant C. This addition operation may thus obtain a base value. This base value can be stored in a selected location of a destination storage. For example, the base value may correspond to an interpolated value for a pixel for a first coordinate axis (e.g., the X axis). Then control passes to block 240, where additions may be performed between the base value and the first coefficient, a negative value of the first coefficient, and twice the first coefficient. As set forth above in Table 6, these values may be applied to the base value. Furthermore, the results of these base sum operations (i.e., base sums) may be stored in each of multiple locations of the destination storage. For example, with reference to a 16 wide vector, the base sums can be stored in three places of the vector register.

With reference now to block 250, similar addition operations may be performed, namely additions between each of these base sums and the second coefficient, negative second coefficient, and twice the second coefficient. Similarly, each of these sums can be stored in a given location of the destination storage, which may be another portion of a single vector register or may be portions of a second vector register. Note that here, each of the coefficients may be applied via an addition operation with each of the base sums, thus yielding 12 different add operations, and storing the 12 different sums each in one location of one or more destination storages. While shown with this particular implementation in the embodiment of FIG. 3, understand the scope of the present invention is not limited in this regard. Furthermore, understand that the operations set forth in FIG. 3 are for execution of a single multiply-multiply-accumulate instruction, which can be part of a graphics workload that has further operations performed both before and after this instruction.

Figure 4:
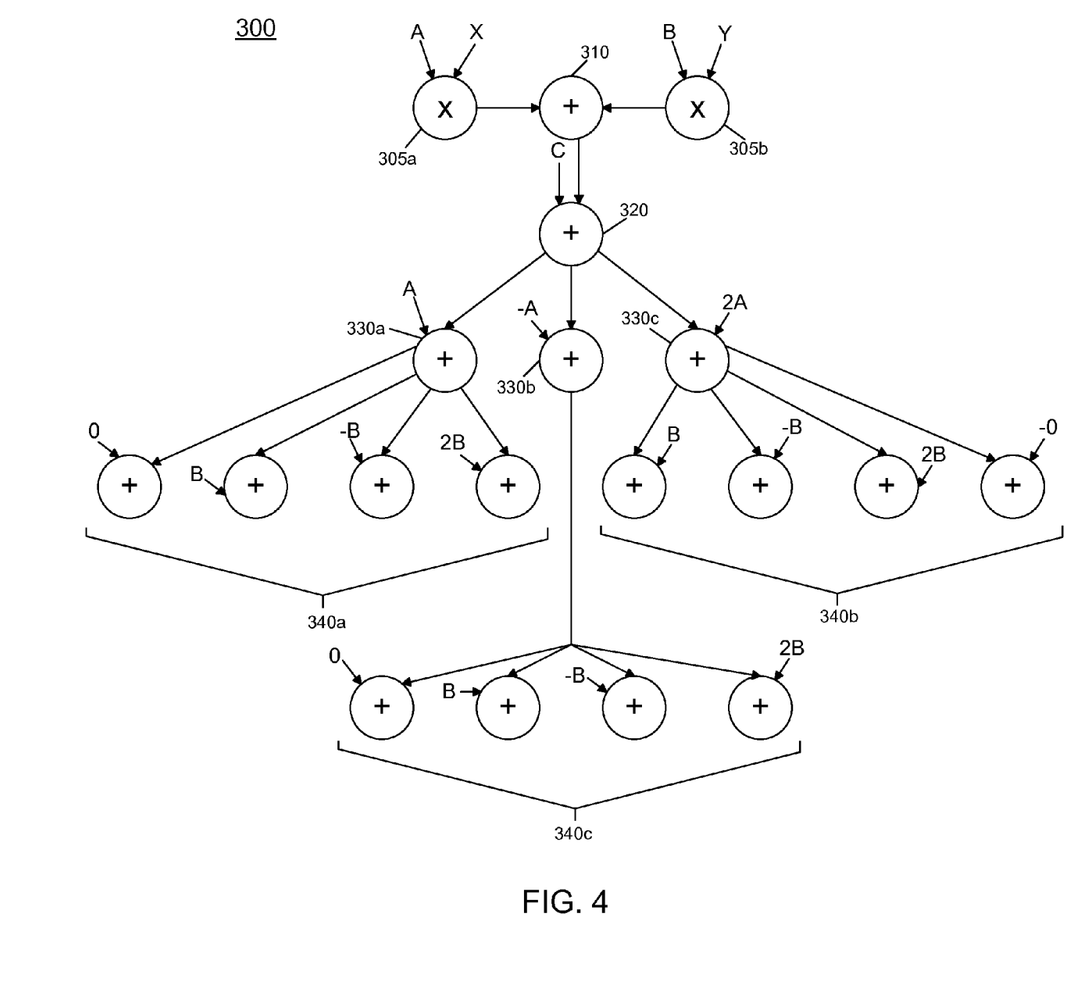
FIG. 4 is a block diagram of a hardware implementation of logic for handling a multiply-multiply-accumulate instruction in accordance with an embodiment of the present invention.

Referring now to FIG. 4, shown is a block diagram of a hardware implementation of logic for handling a multiply-multiply-accumulate instruction in accordance with an embodiment of the present invention. Logic 300 may be part of a processor pipeline. For example, logic 300 may be an execution unit within the processor such as a multiply accumulate unit, e.g., a floating-point multiply accumulate unit. However, in other implementations dedicated circuitry that is separate from a MAC unit can be used.

Still referring to FIG. 4, it is seen that logic 300 can be implemented as a tree structure having a plurality of levels, including multipliers and adders. In the specific implementation shown in FIG. 4, 2 multipliers and 17 adders may be present, although the scope of the present invention is not limited in this regard. In general, logic 300 may be configured to perform a multiply-multiply-add operation to populate a vector with multiple data elements, each corresponding to a value for a given pixel of a pixel block, for example.

As seen, a first level of logic 300 may include a pair of multipliers 305a-305b, each of which is to multiply an incoming reference value (e.g., X and Y) with a corresponding coefficient (e.g., A and B.). The resulting product may be provided to a first adder 310 which adds the two products to obtain a first sum, which is then combined with a third coefficient (e.g., C) in a second adder 320. This resulting base term may then be provided to another level of adders 330a-330c, each of which is to perform an addition between a representation of the first coefficient (e.g., A, −A, and 2A). These resulting sums can then be provided to another level of adders 340a-340c, each of which includes a plurality of individual adders to add a sum from a corresponding adder of the second level and a representation of the second coefficient (e.g., 0, B, −B, and 2B). The resulting sums of each of the adders may be populated into one or more vector registers, as discussed above to thus efficiently perform operations, e.g., during graphics processing. While shown with this particular implementation in the embodiment of FIG. 4, the scope of the present invention is not limited in this regard.

Figure 5:
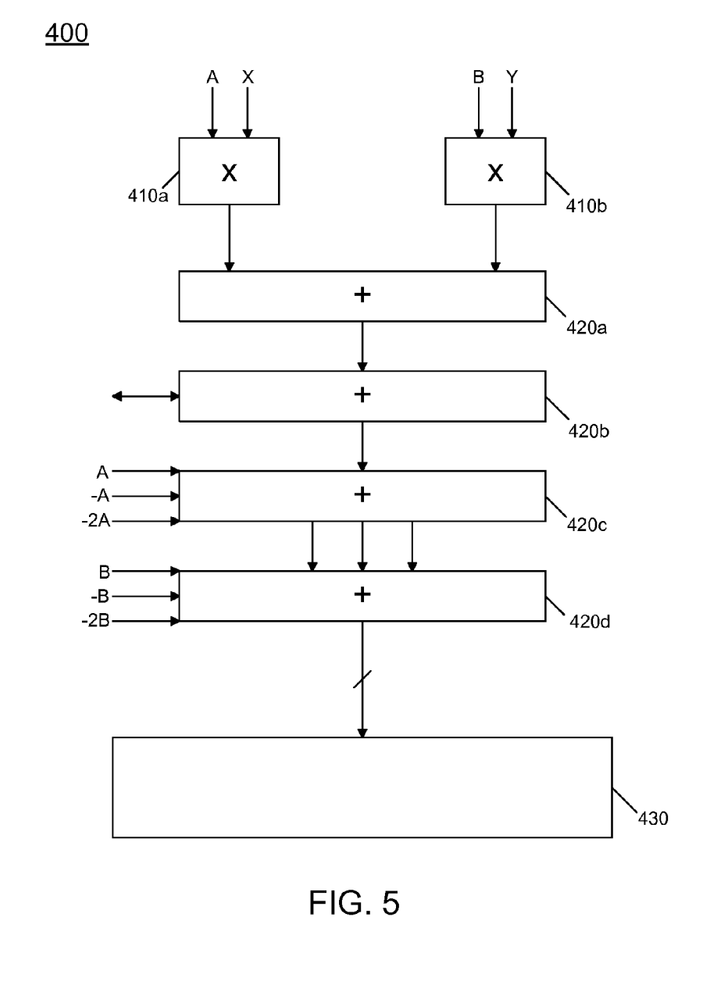
FIG. 5 is a block diagram of a multiply-accumulate (MAC) unit in accordance with an embodiment of the present invention.

FIG. 5 in turn is a block diagram of a MAC unit in accordance with an embodiment of the present invention. As seen, MAC unit 400 may be configured to receive incoming instructions (e.g., in the form of one or more µops) to direct execution of a given operation and associated operands. In the context of a SUPERMADD instruction, the operands can include multiple reference values, coefficients, constants, and so forth. For example, in one embodiment a user-level instruction may include an opcode and multiple input values, and may take the following form:

SUPERMADD operand1, operand 2 where operand1 is a memory location that has A,B,C stored in memory (which in one embodiment can each be a FP32 value stored next to each other), and operand2 is a register (e.g., a 64 bit integer register that holds the two 32 bit integer values for X and Y). In an alternate embodiment, the register may be a 32 bit integer register that holds two 16 bit integer values for X and Y. In another alternate embodiment, the register may be a 16 bit integer register that holds two 8 bit integer values for X and Y.

Still referring to FIG. 5, the MAC unit includes multipliers 410a-410b, each of which in one embodiment can be implemented as a compressor tree. In turn, products obtained from the multipliers may be applied to selected ones of a plurality of adder levels 420a-420d. While shown as four such levels, more or fewer levels may be present in different embodiments. In addition, a temporary storage 430 may provide for interim storage of values calculated in the MAC unit such as base terms, intermediate values, final values, and so forth.

Figure 6:
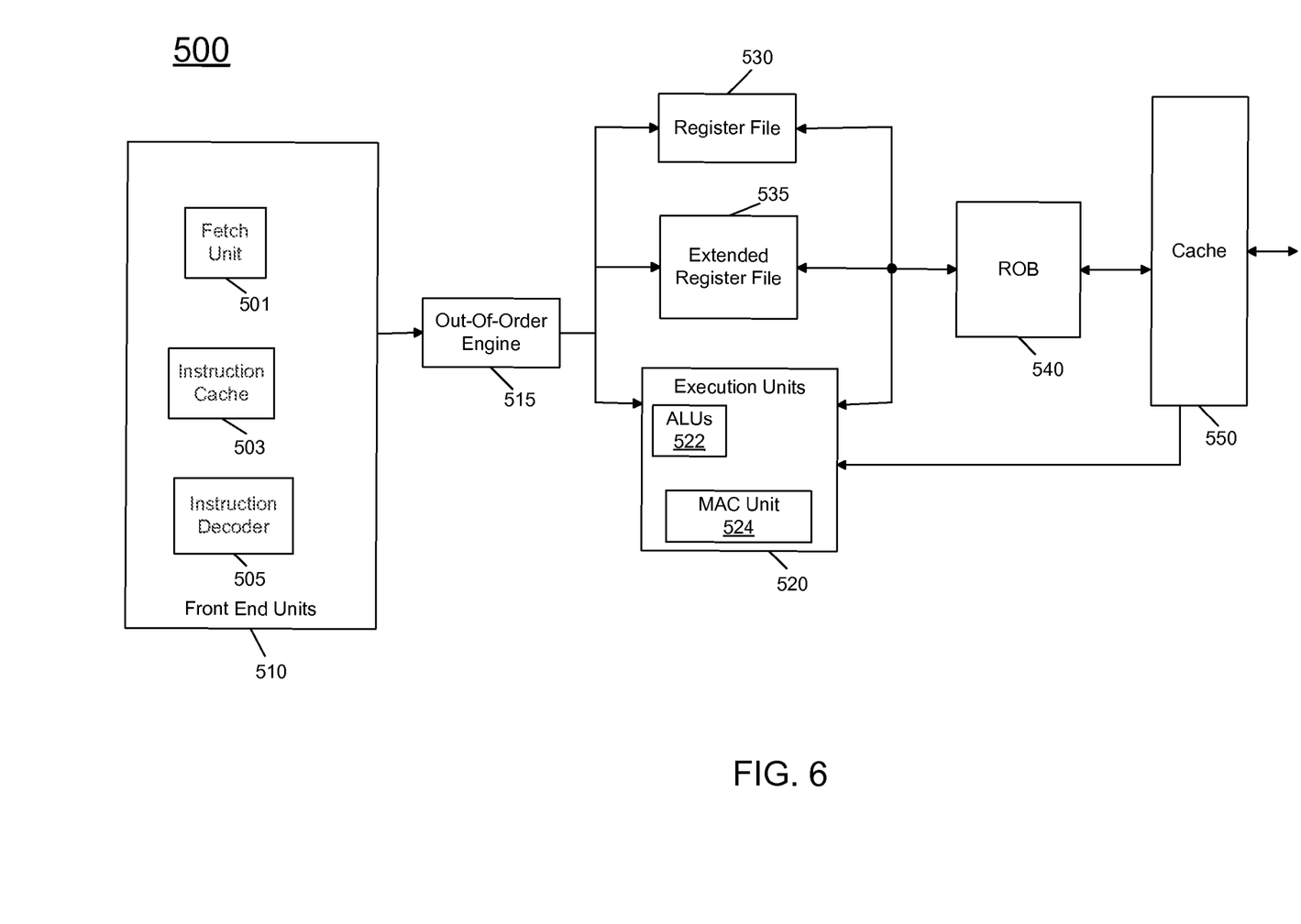
FIG. 6 is a block diagram of a processor core in accordance with one embodiment of the present invention.

Referring now to FIG. 6, shown is a block diagram of a processor core in accordance with one embodiment of the present invention. As shown in FIG. 6, processor core 500 may be a multi-stage pipelined out-of-order processor. Processor core 500 is shown with a relatively simplified view in FIG. 6 to illustrate various features used in connection with execution of a SUPERMADD instruction in accordance with an embodiment of the present invention. As shown in FIG. 6, core 500 includes front end units 510, which may be used to fetch instructions to be executed and prepare them for use later in the processor. For example, front end units 510 may include a fetch unit 501, an instruction cache 503, and an instruction decoder 505. In some implementations, front end units 510 may further include a trace cache, along with microcode storage as well as a micro-operation storage. Fetch unit 501 may fetch macro-instructions, e.g., from memory or instruction cache 503, and feed them to instruction decoder 505 to decode them into primitives, i.e., micro-operations for execution by the processor. One such instruction to be handled in front end units 510 may be a user-level SUPERMADD instruction in accordance with an embodiment of the present invention. This instruction may enable the front end units to access various micro-operations to enable execution of the operations such as described above.

Coupled between front end units 510 and execution units 520 is an out-of-order (OOO) engine 515 that may be used to receive the micro-instructions and prepare them for execution. More specifically OOO engine 515 may include various buffers to re-order micro-instruction flow and allocate various resources needed for execution, as well as to provide renaming of logical registers onto storage locations within various register files such as register file 530 and extended register file 535. Register file 530 may include separate register files for integer and floating point operations. Extended register file 535 may provide storage for vector-sized units, e.g., 256 or 512 bits per register.

Various resources may be present in execution units 520, including, for example, various integer, floating point, and single instruction multiple data (SIMD) logic units, among other specialized hardware. For example, such execution units may include one or more arithmetic logic units (ALUs) 522. In addition, a MAC unit 524 in accordance with an embodiment of the present invention may be present.

Results from the execution units may be provided to retirement logic, namely a reorder buffer (ROB) 540. More specifically, ROB 540 may include various arrays and logic to receive information associated with instructions that are executed. This information is then examined by ROB 540 to determine whether the instructions can be validly retired and result data committed to the architectural state of the processor, or whether one or more exceptions occurred that prevent a proper retirement of the instructions. Of course, ROB 540 may handle other operations associated with retirement.

As shown in FIG. 6, ROB 540 is coupled to a cache 550 which, in one embodiment may be a low level cache (e.g., an L1 cache) although the scope of the present invention is not limited in this regard. Also, execution units 520 can be directly coupled to cache 550. From cache 550, data communication may occur with higher level caches, system memory and so forth. While shown with this high level in the embodiment of FIG. 6, understand the scope of the present invention is not limited in this regard. For example, while the implementation of FIG. 6 is with regard to an out-of-order machine such as of a so-called x86 ISA architecture, the scope of the present invention is not limited in this regard. That is, other embodiments may be implemented in an in-order processor, a reduced instruction set computing (RISC) processor such as an ARM-based processor, or a processor of another type of ISA that can emulate instructions and operations of a different ISA via an emulation engine and associated logic circuitry, such as shown below with regard to FIG. 8.

Figure 7:
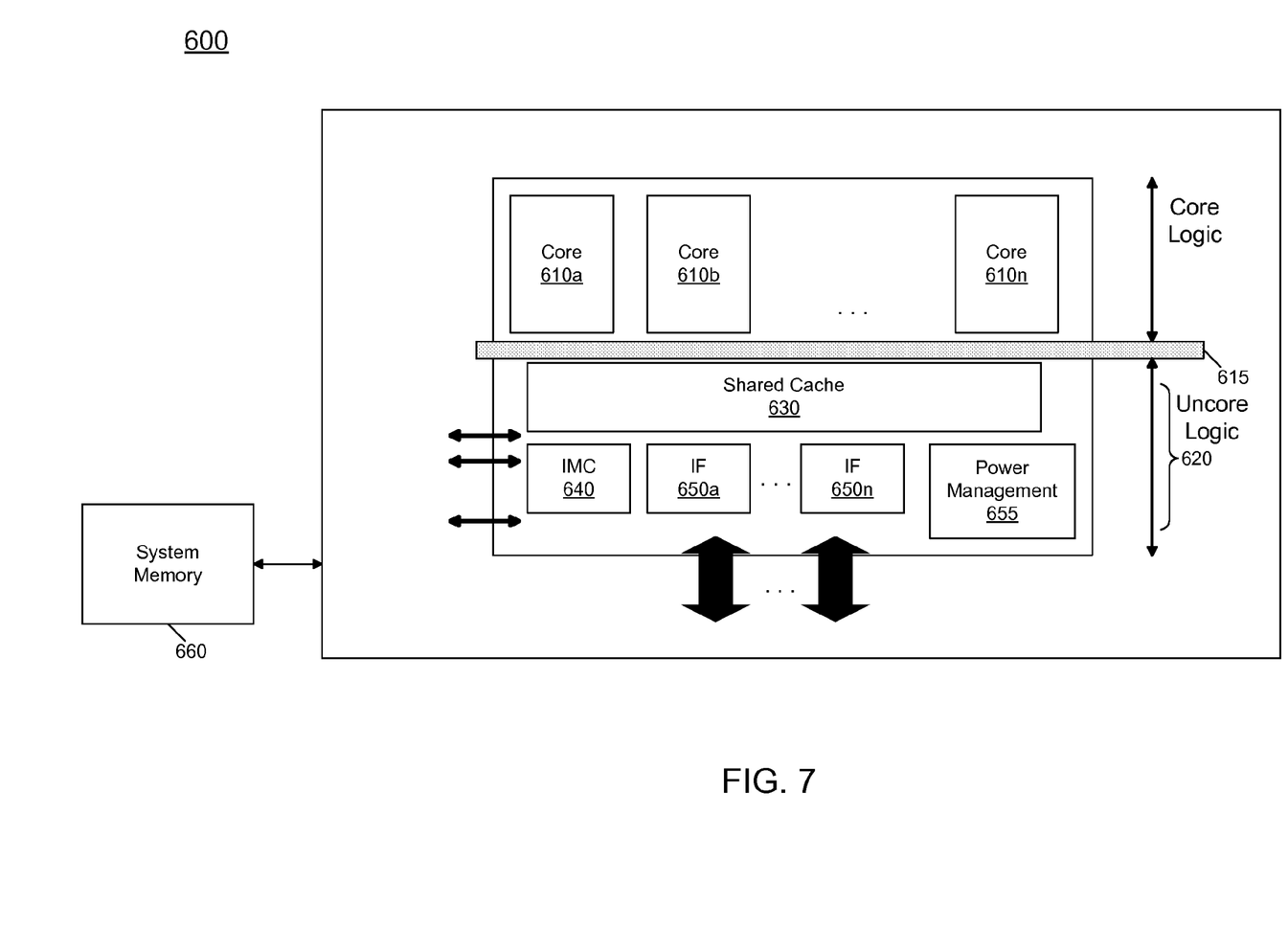
FIG. 7 is a block diagram of a processor in accordance with an embodiment of the present invention.

Referring now to FIG. 7, shown is a block diagram of a processor in accordance with an embodiment of the present invention. As shown in FIG. 7, processor 600 may be a multicore processor including a plurality of cores $610_a$-$610_n$. In one embodiment, each such core may be configured as core 500 described above with regard to FIG. 6. The various cores may be coupled via an interconnect 615 to an uncore 620 that includes various components. As seen, the uncore 620 may include a shared cache 630 which may be a last level cache. In addition, the uncore may include an integrated memory controller 640, various interfaces 650 and a power management unit 655, which may determine an appropriate low power state in which to place a given core. In turn, power management unit 655 may generate a plurality of control signals to cause various components, both of a given core as well as other processor units to enter into a low power state. As seen, processor 600 may communicate with a system memory 660, e.g., via a memory bus. In addition, by interfaces 650, connection can be made to various off-chip components such as peripheral devices, mass storage and so forth. While shown with this particular implementation in the embodiment of FIG. 7, the scope of the present invention is not limited in this regard.

In other embodiments, a processor architecture may include emulation features such that the processor can execute instructions of a first ISA, referred to as a source ISA, where the architecture is according to a second ISA, referred to as a target ISA. In general, software, including both the OS and application programs, is compiled to the source ISA, and hardware implements the target ISA designed specifically for a given hardware implementation with special performance and/or energy efficiency features.

Figure 8:
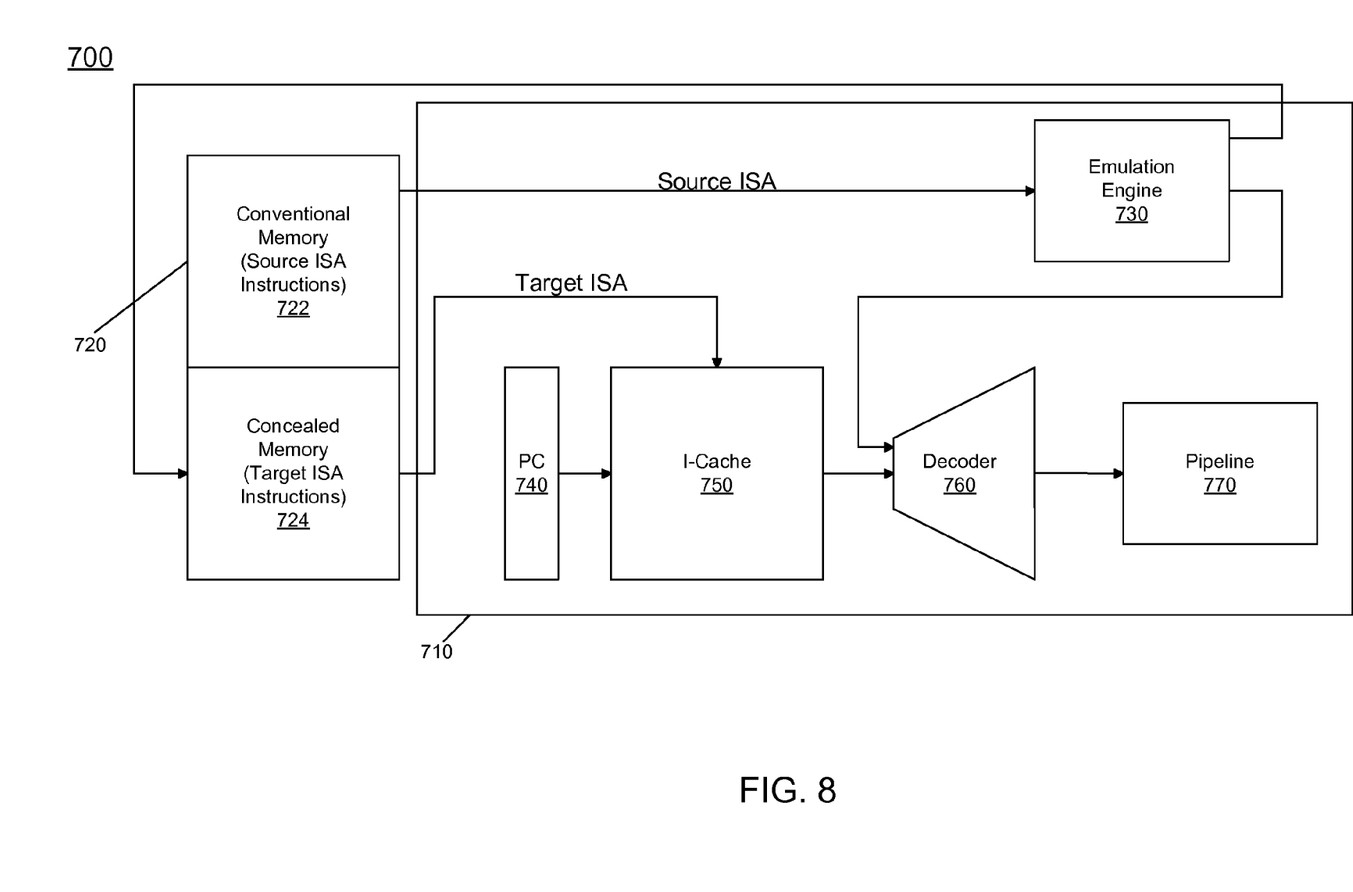
FIG. 8 is a block diagram of a processor in accordance with another embodiment of the present invention.

Referring now to FIG. 8, shown is a block diagram of a processor in accordance with another embodiment of the present invention. As seen in FIG. 8, system 700 includes a processor 710 and a memory 720. Memory 720 includes conventional memory 722, which holds both system and application software, and concealed memory 724, which holds software instrumented for the target ISA. As seen, processor 710 includes an emulation engine 730 which converts source code into target code. Emulation may be done with either interpretation or binary translation. Interpretation is often used for code when it is first encountered. Then, as frequently executed code regions (e.g., hotspots) are discovered through dynamic profiling, they are translated to the target ISA and stored in a code cache in concealed memory 724. Optimization is done as part of the translation process and code that is very heavily used may later be optimized even further. The translated blocks of code are held in code cache 724 so they can be repeatedly re-used.

Still referring to FIG. 8, processor 710, which may be one core of a multicore processor includes a program counter 740 that provides instruction pointer addresses to an instruction cache (I-cache) 750. As seen, I-cache 750 may further receive target ISA instructions directly from concealed memory portion 724 on a miss to a given instruction address. Accordingly, I-cache 750 may store target ISA instructions which can be provided to a decoder 760 which may be a decoder of the target ISA to receive incoming instructions, which may be at the macro-instruction level and to convert the instructions to micro-instructions for execution within a processor pipeline 770. While the scope of the present invention is not limited in this regard, pipeline 770 may be an out-of-order pipeline including various stages to perform and retire instructions. Various execution units such as described above may be present within pipeline 770 to execute to a user-level dual multiply-accumulate instruction in accordance with an embodiment of the present invention. That is, even in an implementation in which a processor 710 is of a different micro-architecture than a micro-architecture for which a user-level multiply-multiply-accumulate instruction is provided, the instruction can be executed on the underlying hardware.

Figure 9:
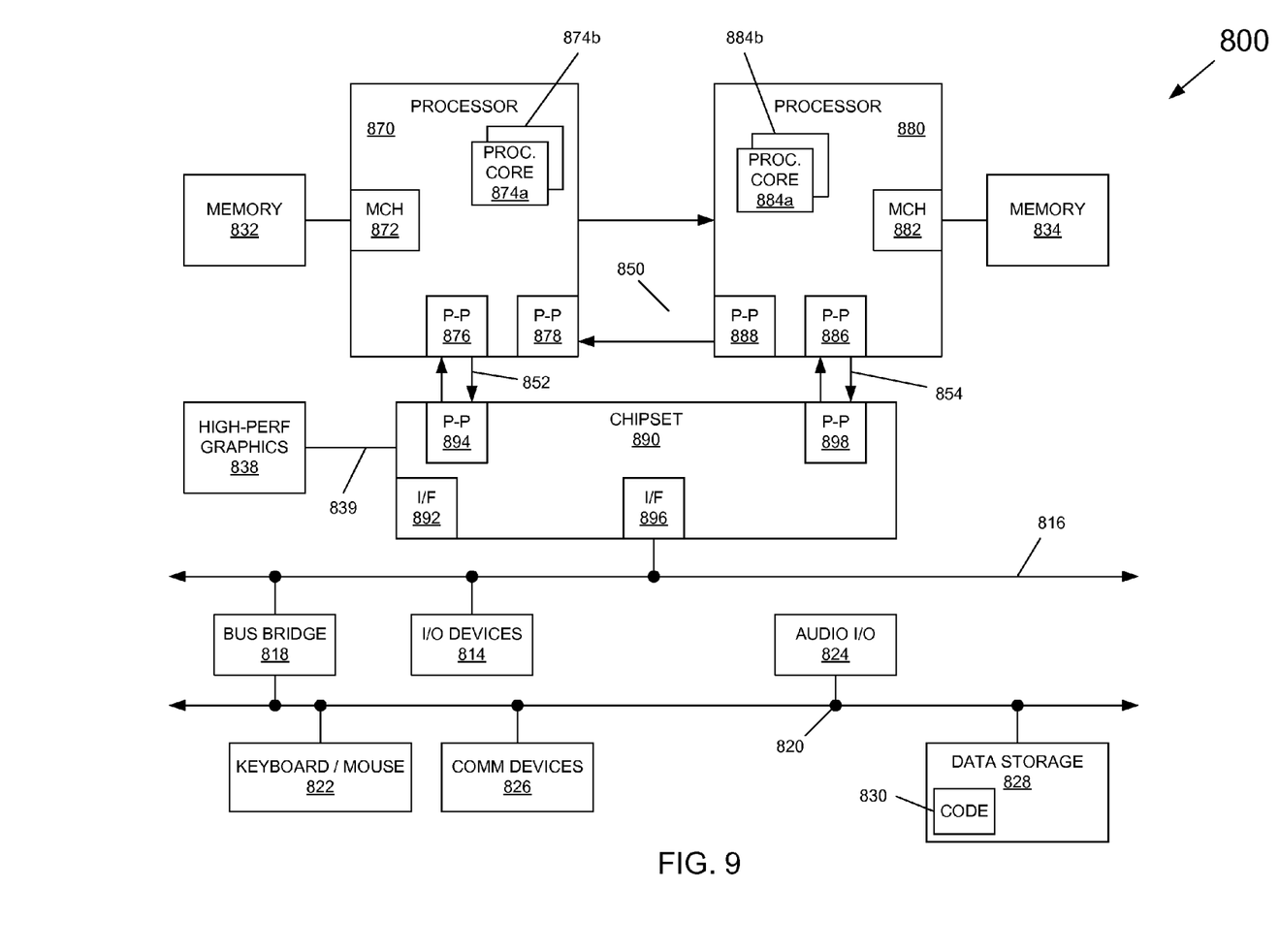
FIG. 9 is a block diagram of a system in accordance with an embodiment of the present invention.

Embodiments may be implemented in many different system types. Referring now to FIG. 9, shown is a block diagram of a system in accordance with an embodiment of the present invention. As shown in FIG. 9, multiprocessor system 800 is a point-to-point interconnect system, and includes a first processor 870 and a second processor 880 coupled via a point-to-point interconnect 850. As shown in FIG. 9, each of processors 870 and 880 may be multicore processors, including first and second processor cores (i.e., processor cores 874a and 874b and processor cores 884a and 884b), although potentially many more cores may be present in the processors. As described above, the processor cores may include MAC units or other logic to perform user-level multiply-multiply instructions in accordance with an embodiment of the present invention.

Still referring to FIG. 9, first processor 870 further includes a memory controller hub (MCH) 872 and point-to-point (P-P) interfaces 876 and 878. Similarly, second processor 880 includes a MCH 882 and P-P interfaces 886 and 888. As shown in FIG. 9, MCH's 872 and 882 couple the processors to respective memories, namely a memory 832 and a memory 834, which may be portions of main memory (e.g., a dynamic random access memory (DRAM)) locally attached to the respective processors. First processor 870 and second processor 880 may be coupled to a chipset 890 via P-P interconnects 852 and 854, respectively. As shown in FIG. 8, chipset 890 includes P-P interfaces 894 and 898.

Furthermore, chipset 890 includes an interface 892 to couple chipset 890 with a high performance graphics engine 838, by a P-P interconnect 839. In turn, chipset 890 may be coupled to a first bus 816 via an interface 896. As shown in FIG. 9, various input/output (I/O) devices 814 may be coupled to first bus 816, along with a bus bridge 818 which couples first bus 816 to a second bus 820. Various devices may be coupled to second bus 820 including, for example, a keyboard/mouse 822, communication devices 826 and a data storage unit 828 such as a disk drive or other mass storage device which may include code 830, in one embodiment. Further, an audio I/O 824 may be coupled to second bus 820.

Embodiments may be implemented in code and may be stored on a storage medium having stored thereon instructions which can be used to program a system to perform the instructions. The storage medium may include, but is not limited to, any type of non-transitory storage medium such as disk including floppy disks, optical disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
  a processor having a plurality of execution units, at least one of the execution units including a circuit comprising:
    a first multiplier to multiply a first reference value with a first coefficient to obtain a first product;
    a second multiplier to multiply a second reference value with a second coefficient to obtain a second product;
    a first adder to combine the first and second products to obtain a first sum;
    a second adder to combine the first sum and a third term to obtain a base value;
    a third level of adders each to combine the base value with one of a plurality of representations of the first coefficient to obtain a first sum set; and
    a fourth level of adders each to combine the first sum set with one of a plurality of representations of the second coefficient to obtain a second sum set, wherein the circuit is to populate a vector destination storage having a plurality of locations each to store an output of one of the third and fourth levels of adders.

2. The apparatus of claim 1, wherein each location of the plurality of locations corresponds to a pixel of a pixel block.

3. The apparatus of claim 1, wherein the circuit is part of a multiply-accumulate (MAC) unit.

4. The apparatus of claim 1, wherein the circuit is to populate the vector destination storage responsive to a user-level multiply-multiply-add instruction.

5. The apparatus of claim 4, wherein the circuit is to receive the first and second reference values and the third term associated with the user-level multiply-multiply-add instruction.

6. The apparatus of claim 5, wherein the processor further includes a front end unit to receive the first and second reference values and the user-level multiply-multiply-add instruction.

7. The apparatus of claim 4, wherein the circuit is to perform two multiplication operations and greater than 16 addition operations responsive to the user-level multiply-multiply-add instruction.

8. A method comprising:
  receiving a dual multiply-add instruction in a front end unit of a processor;
  decoding the dual multiply-add instruction and sending the decoded instruction and operands therefore to an execution unit of the processor; and
  executing the decoded instruction in the execution unit, including performing a plurality of multiplication operations, first and second additions to obtain a base value, manipulating the base value in a first set of adders to obtain intermediate sum values, manipulating each of the intermediate sum values in a second set of adders to obtain final sum values, and storing at least the intermediate sum values and final sum values in a destination storage.

9. The method of claim 8, wherein performing the plurality of multiplication operations includes:
  performing a first multiplication of a first operand and a first coefficient to obtain a first product; and performing a second multiplication of a second operand and a second coefficient to obtain a second product.

10. The method of claim 9, wherein performing the first addition comprises combining the first product and the second product to obtain a first sum.

11. The method of claim 10, wherein performing the second addition comprises combining the first sum and a third term to obtain the base value.

12. The method of claim 11, wherein manipulating the base value includes performing addition operations between the base value and the first coefficient, a negative value of the first coefficient, and twice the first coefficient, to obtain the intermediate sum values.

13. The method of claim 12, wherein manipulating each of the intermediate sum values includes performing addition operations between each of the intermediate sum values and the second coefficient, a negative value of the second coefficient, and twice the second coefficient, to obtain the final sum values.

14. A system comprising:
a processor having a plurality of execution units, at least one of the execution units including a circuit comprising a multiply-accumulate (MAC) unit including a plurality of multipliers and a plurality of adders, and to execute a user-level multiply-multiply-accumulate instruction to populate a destination storage with a plurality of elements each corresponding to a value for a pixel of a pixel block, wherein a number of the plurality of adders exceeds a number of pixels in the pixel block; and
a dynamic random access memory (DRAM) coupled to the processor.

15. The system of claim 14, wherein the MAC unit is to perform a plurality of multiplication operations and a plurality of addition operations responsive to a single one of the user-level multiply-multiply-accumulate instruction.

16. The system of claim 15, wherein the single instruction is associated with first and second reference elements, first and second coefficients, and a constant.

17. The system of claim 16, wherein the MAC unit comprises:
a first multiplier to multiply the first reference element with the first coefficient to obtain a first product;
a second multiplier to multiply the second reference element with the second coefficient to obtain a second product;
a first adder to combine the first and second products to obtain a first sum; and
a second adder to combine the first sum and the constant to obtain a base value.

18. The system of claim 17, wherein the MAC unit further comprises:
a third level of adders each to combine the base value with one of a plurality of representations of the first coefficient to obtain a first sum set, each of the first sum set corresponding to one of the absolute values; and
a fourth level of adders each to combine the first sum set with one of a plurality of representations of the second coefficient to obtain a second sum set, each of the second sum set corresponding to one of the absolute values.

19. The system of claim 17, wherein the base sum corresponds to one of the absolute values.

20. The system of claim 15, wherein the MAC unit is to perform the plurality of multiplication operations and more than X addition operations responsive to the single instruction, wherein X corresponds to a number of the plurality of elements of the destination storage, the MAC unit including more than X adders.

* * * * *